United States Patent [19]
George

[11] Patent Number: 5,657,252
[45] Date of Patent: Aug. 12, 1997

[54] DYNAMICALLY CONFIGURABLE EQUIPMENT INTEGRATION ARCHITECTURE

[75] Inventor: Stephen Henry George, Austin, Tex.

[73] Assignee: Motorola, Inc., Schaumburg, Ill.

[21] Appl. No.: 536,019

[22] Filed: Sep. 29, 1995

[51] Int. Cl.$^6$ ................................................. G06F 19/00
[52] U.S. Cl. ................. 364/550; 364/551.01; 364/468.02
[58] Field of Search ....................................... 364/131–136,
364/138, 468.01, 468.02, 468.15, 468.16,
468.17, 468.18, 468.22, 468.23, 550, 551.01,
551.02, 552; 395/211, 200.01–200.21

[56] References Cited

U.S. PATENT DOCUMENTS

| | | | |
|---|---|---|---|
| 5,432,940 | 7/1995 | Potts et al. | 395/700 |
| 5,475,843 | 12/1995 | Halviatti et al. | 395/700 |
| 5,487,169 | 1/1996 | Vranex et al. | 395/700 |
| 5,528,503 | 6/1996 | Moore et al. | 364/131 |
| 5,600,833 | 2/1997 | Senn et al. | 395/500 |
| 5,608,874 | 3/1997 | Ogawa et al. | 395/200.15 |

*Primary Examiner*—James P. Trammell
*Attorney, Agent, or Firm*—Bruce E. Hayden

[57] ABSTRACT

A dynamically configurable equipment integration architecture automatically records on a Host Computer (10) statistics from operation of Factory Equipment (18) received from a GEM Interface Server (16). The format of relevant messages containing selected reports are described in a Configuration File (44). Reports are enabled by execution of a Sampling Plan (50). Messages containing the selected reports received from the GEM Interface Server (16) are translated into a Script (46) utilizing the Configuration File (44). Interpreting the Script (46) causes statistics contained in the reports to be written to an Output File (52) stored on Secondary Storage (30) on the Host Computer (10).

21 Claims, 9 Drawing Sheets

DYNAMICALLY CONFIGURABLE EQUIPMENT INTEGRATION ARCHITECTURE

FIELD OF THE INVENTION

The present invention generally relates to Data Communications, and more specifically to data communications between a host computer and factory equipment in a Computer Integrated Manufacturing (CIM) environment.

BACKGROUND OF THE INVENTION

The primary standards for communications with semiconductor manufacturing machines come from the Semiconductor Equipment and Materials International (SEMI) and are titled "SEMI Equipment Communications Standard Part I" (SECS-I) and "SEMI Equipment Communications Standard Part II" (SECS-II). SECS-I is a layered protocol between factory equipment interface servers and host computers. SECS-II defines the details of the interpretation of messages exchanged between intelligent equipment and a host.

Requiring that equipment vendors comply with the SEMI standards is a good first step in implementing CIM Equipment Integration (EI). However, different types of manufacturing equipment have different requirements. Different vendors of similar equipment may likewise make different facilities available. The result is that much of the critical SECS-II communications host code has to be rewritten for each different type of equipment from each different manufacturer.

Current practice has been to develop EI system components targeted at specific equipment in specific CIM environments. Code reuse is achieved only in the form of code templates that are used as the starting point for customization. The output of this process is vulnerable to changes in the CIM system requirements or equipment interface specifications often requiring time-consuming rework.

A recent SEMATECH Equipment Interface Development (EID) project monthly report cited the average development time for a single component of many to be approximately 130–220 man-hours. This development time can be reduced to 45 man-hours using a combination of code templates and the SEMATECH proposed Automated Equipment Interface (AEI) SECS message set. Reducing time-to-market and cycle time require that this development time be further reduced.

SUMMARY OF THE INVENTION

In accordance with the invention, a dynamically configurable equipment integration architecture automatically records on a Host Computer statistics from operation of factory equipment received from a GEM Interface Server. The format of relevant messages containing selected reports are described in a Configuration File. Reports are enabled by execution of a Sampling Plan. Messages containing the selected reports received from the GEM Interface Server are translated into a Script utilizing the Configuration File. Interpreting the Script causes statistics contained in the reports to be written to an Output File stored on Secondary Storage on the Host Computer.

These and other features, and advantages, will be more clearly understood from the following detailed description taken in conjunction with the accompanying drawings. It is important to point out that there may be other embodiments of the present invention which are not specifically illustrated.

DETAILED DESCRIPTION OF THE PREFERRED EMBODIMENT

Figure 1:
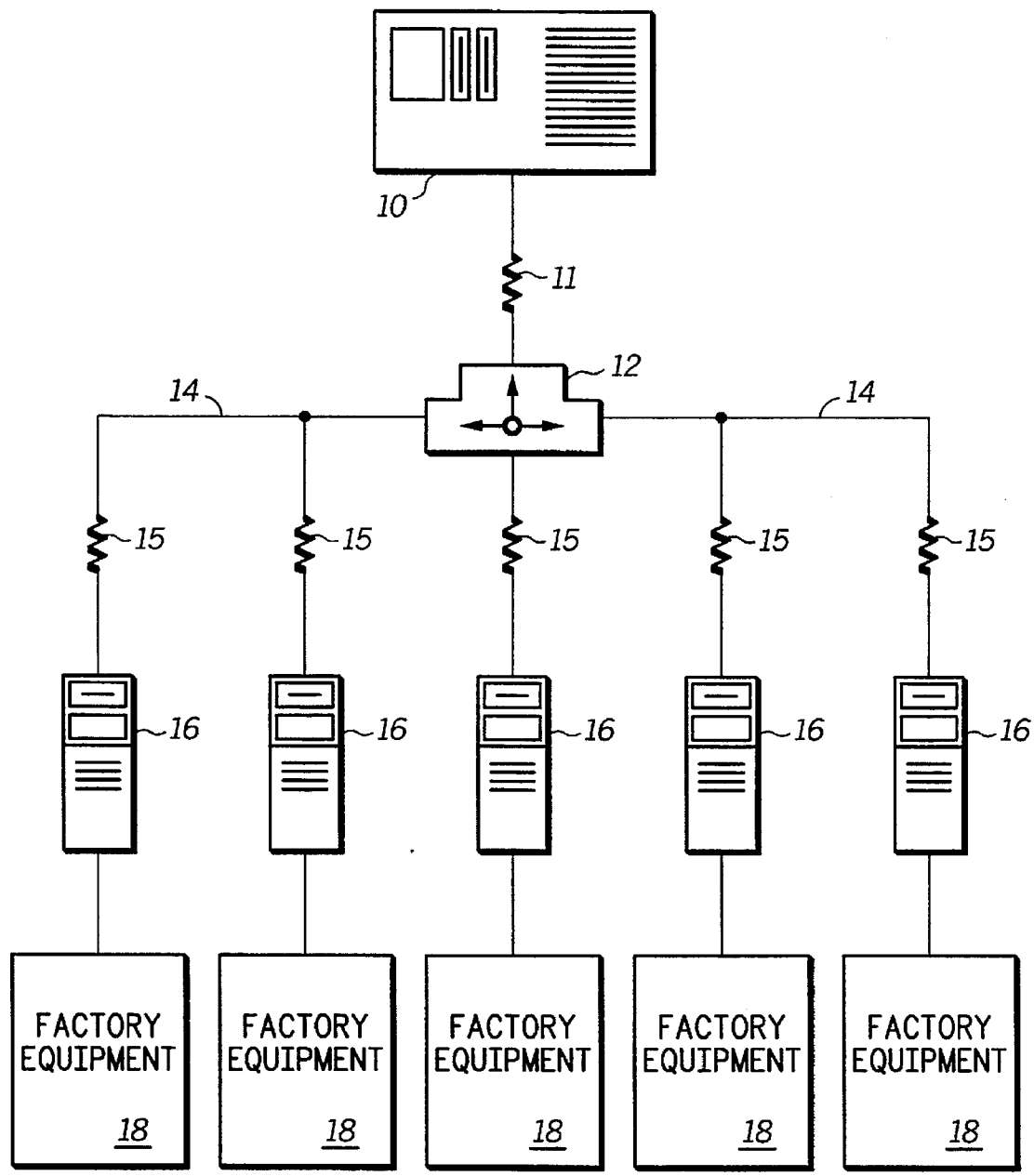
FIG. 1 is a block diagram showing the major hardware components of the invention, in accordance with the present invention.

Computer Integrated Manufacturing (CIM) is becoming more dependent upon Equipment Integration (EI) every day. In the semiconductor manufacturing arena, manufacturers are requiring that any plant manufacturing equipment they purchase be capable of communicating utilizing standardized formats.

The primary standard for communications with semiconductor manufacturing machines comes from the Semiconductor Equipment and Materials International (SEMI) with international headquarters in Mountain View, Calif. The first level of protocols is titled "SEMI Equipment Communications Standard Part I" (SECS-I), SEMI E4-91. This is a layered protocol that defines a communications interface suitable for the exchange of messages between semiconductor processing equipment and a host. Semiconductor processing equipment includes equipment intended for wafer manufacturing, assembly, and packaging. A host is a computer or network of computers which exchange information with the equipment to accomplish manufacturing.

The SECS-I standard includes the description of the physical connector, signal levels, data rate and logical protocols required to exchange messages between the host and equipment over a serial point-to-point data path. It does not define the data within the message.

The "SEMI Equipment Communications Standard Part 2" (SECS-II), SEMI E5-94, defines the details of the interpretation of messages exchanged between intelligent equipment and a host. The SECS-II specification was developed in cooperation between SEMI and the Japan Electronic Industry Development Association Committee 12 on Equipment Communications.

SECS-II defines standard support for the most typical activities required for Integrated Circuit (IC) manufacturing. It also provides for the definition of equipment-specific messages to support those activities not covered by standard messages. While certain activities can be handled by common software in the host, it was expected that equipment-specific host software would be required to support the full capabilities of specific equipment.

SEMI also publishes a Generic Equipment Model ("GEM") specification, SEMI E30-94. GEM defines a standard implementation of SECS-II for all semiconductor manufacturing equipment. The GEM standard defines a common set of equipment behavior and communications capabilities that provide the functionality and flexibility to support the manufacturing automation programs of semiconductor device manufacturers.

The current definitions of SECS-I, SECS-II, and GEM are included in "*Equipment Automation/Software Volume 1*" and in "Equipment Automation/Software Volume II" available from SEMI at any of its primary locations including its International Headquarters at 805 East Middlefield Road, Mountain View, Calif. 94043-4080 USA, both volumes included herein by reference.

Requiring that equipment vendors comply with the SEMI standards is a good first step in implementing CIM Equipment Integration (EI). However, different types of manufacturing equipment have different requirements. Different vendors of similar equipment may likewise make different facilities available. The result is that much of the critical SECS-II communications host code has to be rewritten for each different type of equipment from each different manufacturer.

Current practice has been to develop EI system components targeted at specific equipment in specific CIM environments. Code reuse is achieved only in the form of code templates that are used as the starting point for customization. The output of this process is vulnerable to changes in the CIM system requirements or equipment interface specifications often requiring time-consuming rework.

A recent SEMATECH Equipment Interface Development (EID) project monthly report cited the average development time for a Virtual Factory Equipment Interface (VFEI) driver to be 130-220 man-hours. A VFEI driver is only one component of an E1 system. The development time can be reduced to 45 man-hours using a combination of code templates and the SEMATECH proposed Automated Equipment Interface (AEI) SECS message set. In furtherance of Motorola's 10x cycle time reduction initiative, this invention caused the development time to be brought down to approximately 4 hours.

The main function of manufacturing equipment in a factory is to perform the physical processing on the material. It is responsible for the collection and notification of data, alarm, and event information. It may also provide remote methods for allowing external control of the process definition through either equipment settings or recipes and process execution through remote commands.

Equipment Integration (EI) servers provide the software interface to the functionality offered by the equipment. The servers are an integral part of a larger CIM system. A good EI architecture should provide the CIM system with a consistent abstract interface for performing high level manufacturing functions.

The server functions should be at the semantic level of "Start Job" or "Stop Job". "Start Job" may require the server to complete some transaction with another factory system. For example, it may have to communicate with a recipe management system. If "Start Job" specifies a batch of many lots, the equipment server may do the individual lot scheduling and routing. Similar equipment specific behavior is necessary to support cluster tools.

Separating factory specific behaviors from equipment specific behaviors enables reuses of the equipment specific components in other factory environments. This separation also minimizes the change required to the EI server if factory system policies change over time.

Factory and equipment behaviors should also be clearly separated from the communication mechanism via a defined interface. SEMATECH's Virtual Factory Equipment Interface (VFED provides such an interface.

This invention includes translation of SECS-II encoded information. A more detailed description of the SECS-II protocol is helpful in understanding the invention.

A SECS-II message is a number of binary coded blocks of information. Each block contains a header and a data section composed of self-describing data items. Each data item is defined by its type, length, and value. The standard defines a number of data item types. One of the most important types is a recursive list structure allowing the definition of arbitrary complex data structure. This arbitrary complexity contributes significantly to the problem outlined above.

All the standard SECS-II messages are defined as structures of data items that can include equipment specific data items determined by their respective equipment vendors. A compatible server would need to have knowledge of the equipment specific data items' types and names. A data item's position in a data structure may also provide important information.

All information transmitted according to the SECS-II standard is formatted using two data structures: items and lists. These data structures define the logical divisions of the message, as distinct from the physical division of the message transfer protocol.

An item is an information packet which has a length and a format defined by the first 2, 3, or 4 bytes of the item. These first 2, 3, or 4 bytes are the item header (IH). The IH consists of the format byte and the length byte(s) as shown in Table T-1. Bits 1 and 2 of the IH are the Number of Length Bytes (NLB) in the IH. The Item Length (IL) refers to the number of bytes following the Item Header (IH) that constitutes the Item Body (IB), which is the actual data of the item. The IL refers only to the length of the IB, and does not include the IH.

TABLE T-1

| Item Header | | | | | | | | | |
|---|---|---|---|---|---|---|---|---|---|
| | Bytes | 8 | 7 | 6 | 5 | 4 | 3 | 2 | 1 | Bit |
| Format Byte | 1 | Item Format Code (see T-2) | | | | | NLB | | |
| Item Length | 2 | msb <———Length———> lsb | | | | | | | MS Byte |
| | 3 <———————Length———————-> | | | | | | | | |
| Bytes | 4 | msb <———Length———> lsb | | | | | | | LS Byte |

NLB (Number of Length Bytes)

0 Illegal - Data format error
1 One binary length byte (max=255)
2 Two binary length bytes(max=64k)
3 Three binary length bytes(max=8m)

All bytes in a given Item Body (IB) will be in the Item Format determined by the Item Format Code in the Item Header Table. Table T-2 illustrates the SECS-II Item Format Codes:

TABLE T-2

| Item Format Codes | | |
|---|---|---|
| Binary | Octal | Meaning |
| 000000 | 00 | List (length in elements) |
| 001000 | 10 | Binary |
| 001001 | 11 | Boolean |
| 010000 | 20 | ASCII |
| 010001 | 21 | JIS-8 |
| 011000 | 30 | 8 byte integer (signed) |
| 011001 | 31 | 1 byte integer (signed) |
| 011010 | 32 | 2 byte integer (signed) |
| 011100 | 34 | 4 byte integer (signed) |
| 100000 | 40 | 8 byte floating point |
| 100100 | 44 | 4 byte floating point |
| 101000 | 50 | 8 byte integer (unsigned) |
| 101001 | 51 | 1 byte integer (unsigned) |

TABLE T-2-continued

| | Item Format Codes | |
|---|---|---|
| Binary | Octal | Meaning |
| 101010 | 52 | 2 byte integer (unsigned) |
| 101100 | 54 | 4 byte integer (unsigned) |

Fourteen of the fifteen Item Format Codes define formats used for groups of data that have the same representation in order to save repeated item headers. Thus a six byte Item Length combined with a 2 byte unsigned integer format (52 Octal) contains three 2 byte integers. Signed integers are two's complement, and floating point numbers correspond to IEEE standard 754.

The fifteenth format is the list. A list is an ordered set of elements, where an element can be either an item or a list. The list header (LH) has the same form as the Item Header (IH) with a format type of zero (0). However, the length bytes refer to the number of elements in the list, rather than to the number of bytes. The list structure allows the grouping of items of related information which may have different formats into useful structures. The recursive aspect of the definition allows for arbitrarily complex data structures.

As noted above, the SECS-II protocol is described more fully in "*Equipment Automation/Software Volume 1*". Examples are given therein of protocol encoding. The manual also includes a large number of predefined messages.

The remainder of this description will discuss the preferred embodiment of the invention. FIG. 1 is a block diagram showing the major hardware components. A CIM application running in a Host Computer 10 communicates with Factory Equipment 18 across communications line 11, router 12, backbone 14, communications lines 15 and through SEMI GEM compliant Interface Servers 16. Usually, the GEM Interface Servers 16 are general purpose computers provided by the Equipment 18 manufacturers. However, they may be integrated into the Factory Equipment 18. The hardware and software protocols between the GEM Interface Servers 16 and the Host Computer 10 are SECS-I and SECS-II.

In the preferred embodiment, the communications lines 11, 15, and backbone 14 are high speed local area network (LANs) links. However, these elements may alternatively comprise any functional equivalent, including twisted pair, fiber optic, wireless LAN and the like. Note also that router 12 and backbone 14 are not necessary for the operation of the invention, but are preferably included to enhance communications performance.

Figure 2:
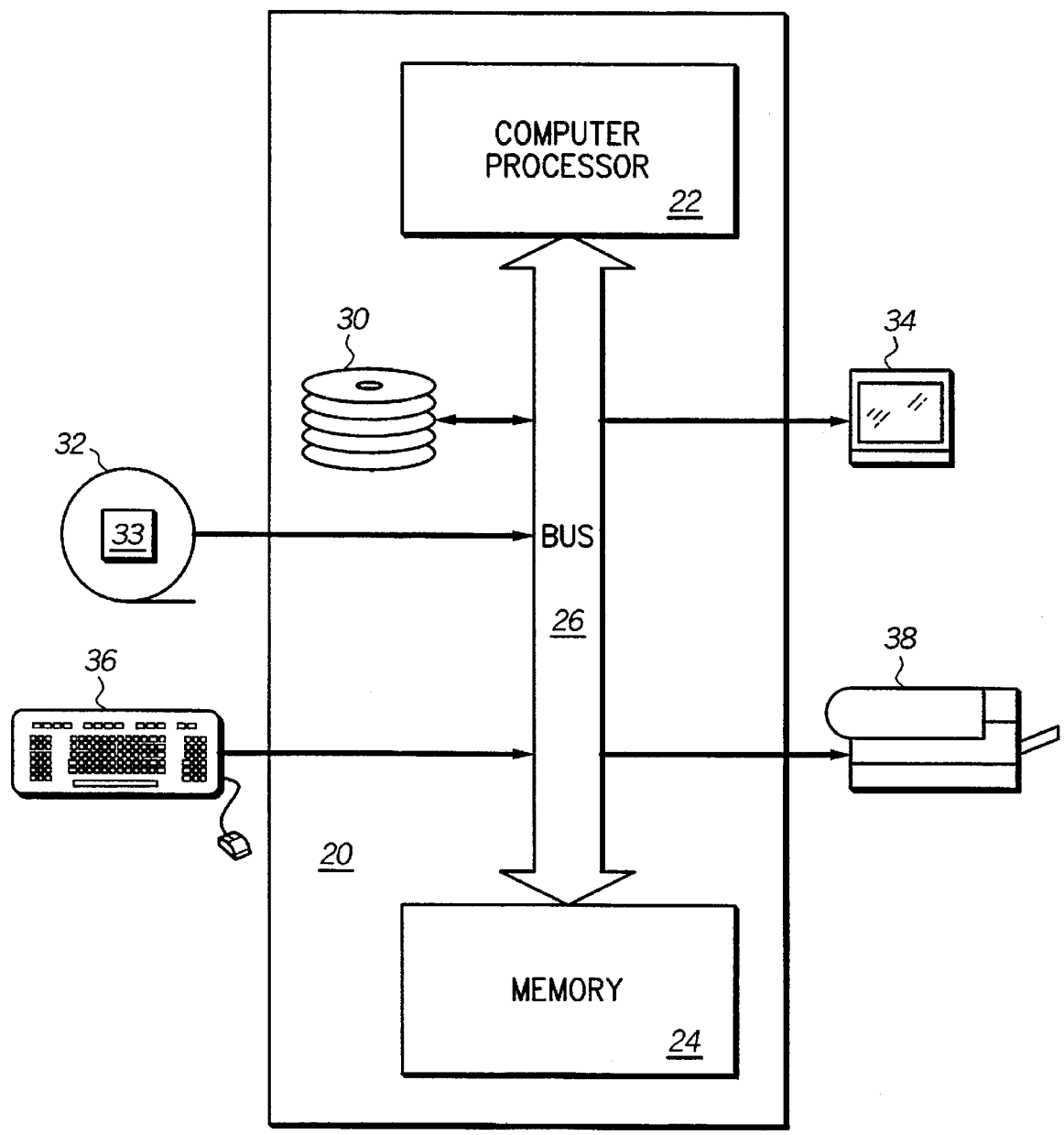
FIG. 2 is a block diagram of a General Purpose Computer used as a Host Computer in FIG. 1.

FIG. 2 is a block diagram of a General Purpose Computer 20 used as a Host Computer 10 in FIG. 1. The General Purpose Computer 20 has a Computer Processor 22 often connected via a Bus 26 with Memory 24. Also attached to the Computer 20 are Secondary Storage 30, External Storage 32, a monitor 34, keyboard 36, and printer 38. The External Storage 32 may be diskettes, CD-ROM, tape, or even another computer. Computer Programs 33 including the Equipment Integration server utilized in this invention can be loaded from the External Storage media 32 either directly into Memory 24 for execution, or staged first to Secondary Storage 32.

Figure 3:
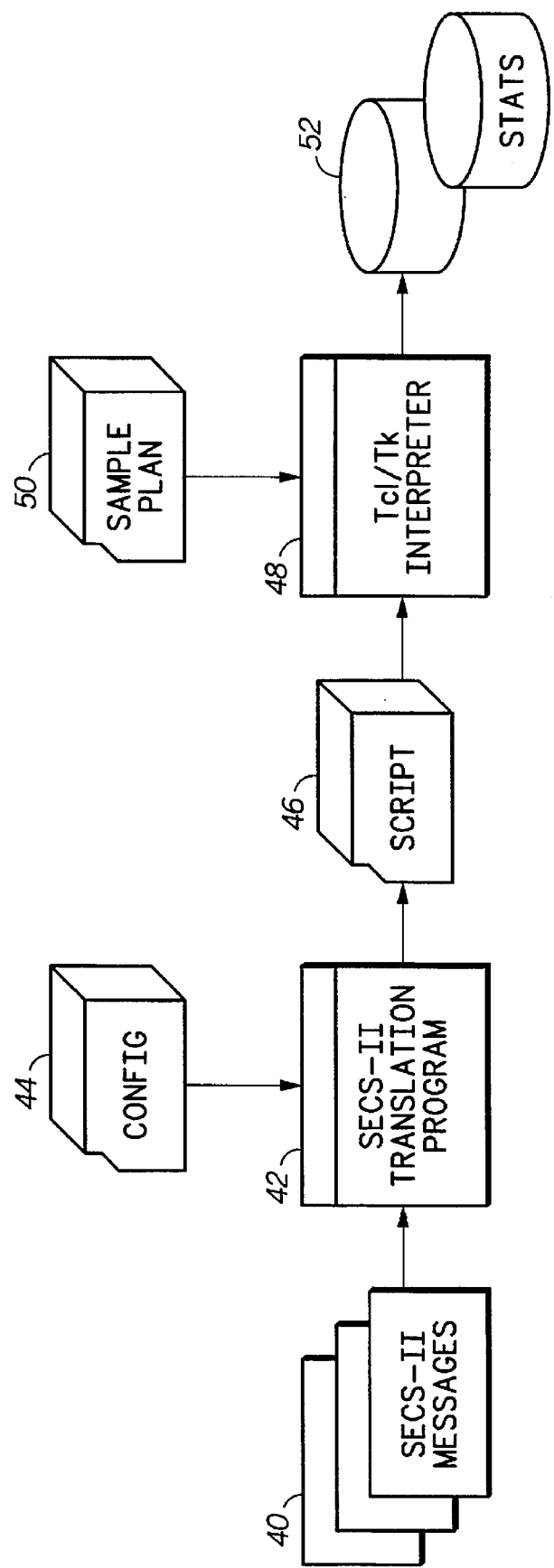
FIG. 3 is a block diagram showing information and file flow between the major components of a preferred embodiment of the invention operating in the Host Computer shown in FIG. 2.

FIG. 3 is a block diagram showing information and file flow between the major components of the invention operating in the Host Computer 10. SECS-II messages 40 are received and translated into a Script 46 by a SECS-II translation program 42. The SECS-II translation is driven by a Configuration 44 which defines the equipment specific implementation of its GEM interface. An example of a Configuration 44 for a Rudolph Focus Ellipsometer (FEiv) with GEM version 4.76 is found in the Attachment.

A Configuration 44 is comprised of Data Items (DI), Status Variables (SV), Data Variables (DV), Reports (RP), and Collection Events (CE). The Data Items (DI), Status Variables (SV), and Data Variables (DV) are defined in terms of their corresponding Information Format Codes (see Table T-2). One difference between these types is that Data Items (DI) are totally defined by their location in a list, while Status Variables (SV) and Data Variables (DV) are self defining. Note that lists are recursively defined as format zero (0) referencing other DI, SV, and DV elements.

Reports (RP) are numbered, and are defined as ordered sequences of DI, SV, and DV elements. The numbering and the corresponding reports can be either built-in to a specific GEM Interface Server 16, or can be dynamically defined by a user application. As implemented by SECS-II, reports are lists with two elements. The first element contains the report number, and the second element contains the report information, which can be either a list, or a data item. Note that there are two types of reports: equipment defined reports (RP) and dynamically defined reports defined in the Sample Plan 50.

The final cards in the Configuration File 44 are Collection Events (CE). These identify messages containing reports sent to and received from the GEM Interface Servers 16. Such a message will consist of a three element list. The first element in the list is an identifier. The second element in the list is the Collection Event Id (CEID). The third element in the list describes the event. Of interest here are those instances where the third element is a list containing one or more reports.

An example of such a message corresponding to the sample Configuration File 44 is included in the Attachment. Note that indention indicates list nesting level. The Attached example has an Event Id of 312. This corresponds to a WAFER_COMPLETE Collection Event (CE). The third element is a list with two reports. The first report has a report number of 4, and the second report has a report number of 101. The first report is equipment defined in the attached configuration to consist of a single ASCII string (type 20) titled CE_TIMESTAMP with a value of "950717150511".

The script 46 generated by the SECS-II translation program 42 is one of two primary inputs to a commercially available Tcl/Tk interpreter 48. The other primary input is a Data Collection Sample Plan File 50. An example of a Sampling Plan 50 follows the corresponding Configuration 44 in the Attachment.

A Sample Plan 50 consists of a series of procedures that are invoked at the occurrence of a corresponding specific event, which may be the encountering of a Collection Event (CE) in a message. Three of the procedures in the Attached example Sample Plan 50 will be discussed. The DCSP_INIT procedure is invoked when the Sampling Plan 50 is initialized by the Tcl/Tk interpreter. It first disables the WAFER_COMPLETE (CE#312). A dynamic report (RP#101) is defined to consist of seven (7) elements. The WAFER_COMPLETE event is then linked to two reports: a staticly defined report (RP#4), and dynamically defined report (RP#101). The WAFER_COMPLETE event is then reenabled.

The "edevent" and "defreport" commands result in messages being sent to the corresponding GEM Interface Server 16. The "edevent" command enables or disables event collection reporting for specific events. Disabled events are not reported by the GEM Interface Server 16, until reenabled. The "defreport" command generates a message that dynamically defines a report (i.e. RP#101).

The EVENT procedure is invoked every time an event message is received from a GEM Interface Server 16. In the example Sample Plan File 50, the EVENT procedure opens an event log, appends a single entry with the CE_TIMESTAMP and event id (CEID) to the event log, and finally closes the event log.

The third procedure is a WAFER_COMPLETE procedure. Its purpose is to process the information in the Server Generated Script 46. It operates by dynamically creating a statistics file using the sample's LOTID, WAFERID, and the CE_TIMESTAMP of the sample. The procedure then inserts statistics into the dynamically created file, closes the file, and publishes the filename.

The fourth section of the Attached Example is a Server Generated Script 46. Each such Script 46 consists of "setting" a number of Tcl/Tk variables to specific values, conditionally invoking a general event (i.e. EVENT) procedure and a specific event (i.e. WAFER_COMPLETE) procedure, followed by "unsetting" each of the previously "set" variables.

Values for the EQUIP_ID, DATAID, and CEID variables come from the message header. In the Attached Example, setting the CEID to WAFER_COMPLETE is based on the Collection Event (CE) 312 in the Attached Configuration File 44. The remainder of the variables "set" and "unset" in the Example Script 46 result from expanding the two reports into their constituent elements. All of the information for this expansion comes from the Configuration File 44 including the high level format of dynamically created reports (i.e. RP#101) and the received SECS event report message. Note in the Attached Example the use of the MEAS_DATA list to contain replicated structures.

The fifth section of the Attached Example is the Resulting Output file 52 from the Tcl/Tk interpreter 48 interpreting the Example Server Generated Script 46 against the Example Data Collection Sample Plan 50. The Output File 52 is generated when the WAFER_COMPLETE procedure is invoked by the Tcl/Tk interpreter 48. This Output File 52 includes the statistics from one set of measurements taken by one piece of Factory Equipment 18 and sent to the Host Computer 10 by the GEM Interface Server 16. Output Files 52 are often stored on Secondary Storage 30.

FIGS. 4–14 are flow charts that describe in more depth one implementation of the SECS-II Translation Program 42 used to translate SECS-II messages into a Script 46 using Configuration 44.

Figure 4:
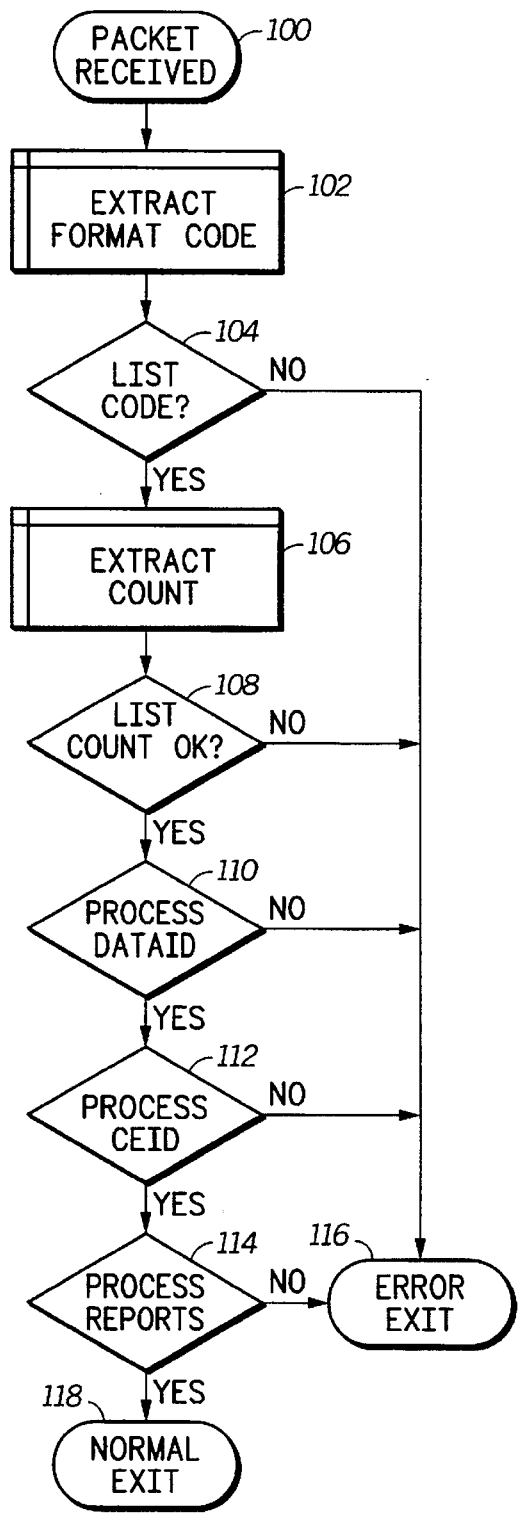
FIGS. 4 through 15 are flow charts illustrating one embodiment of the operation of the invention when a collection event message is received from a GEM Interface Server.

FIG. 4 is a flow chart that is entered when a collection event message is received, step 100, from a GEM Interface Server 16. First, the Element Format Code is extracted, step 102, from the message. If the Element Format Code does not identify a List (0), step 104, the routine error terminates, step 116. Otherwise, the list count is extracted, step 106, and validated, step 108. If not a valid list count, the routine error terminates, step 116. Next the DATAID is extracted and validated, step 110, the CEID is extracted and validated, step 112, and any corresponding reports are processed, step 114. If any of the above three steps fail, the routine error terminates, step 116. Otherwise, the routine returns normally, step 118.

Figure 5:
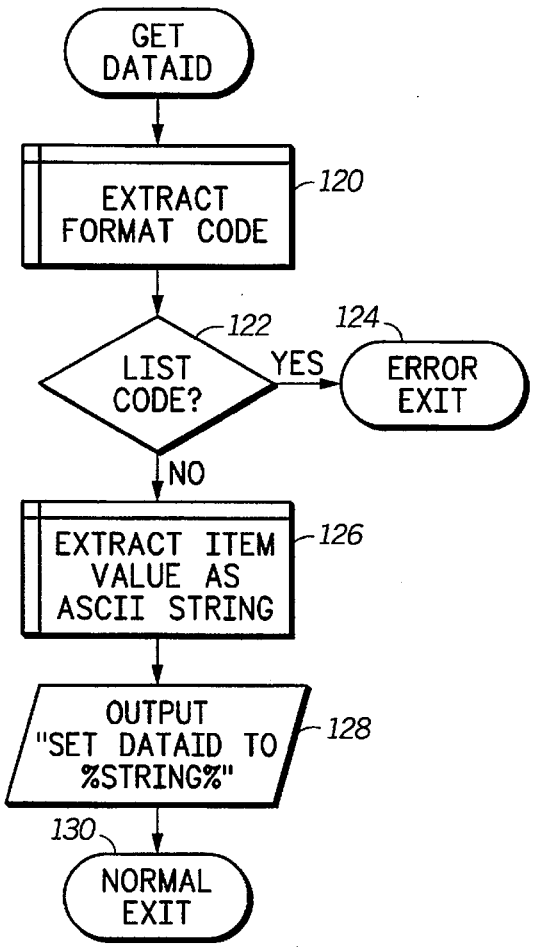

FIG. 5 is a flow chart showing the operation of the get DATAID routine, step 110 in FIG. 4. This routine first extracts the Element Format Code, step 120, from the first element in the message. If the Element Format Code is a List Code (0), step 122, the routine error exits, step 124. Otherwise, the ASCII representation of the value is extracted, step 126, a line is sent to the Script 46 setting the DATAID to the ASCII string, step 128, and the routine returns normally, step 130.

Figure 6:
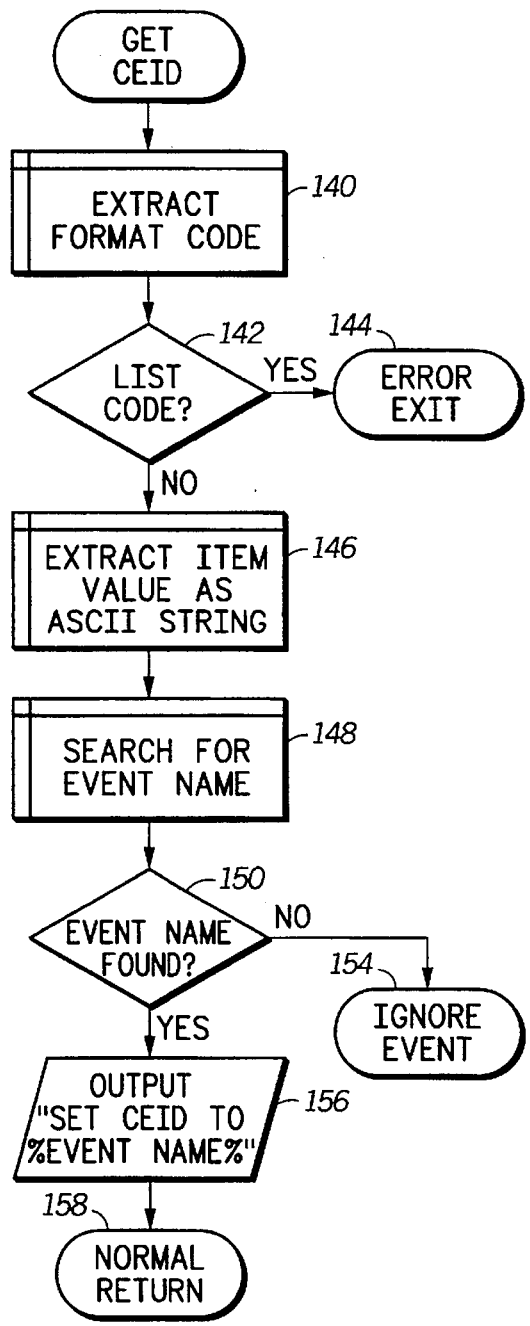

FIG. 6 is a flow chart showing the operation of the get CEID routine, step 112 in FIG. 4. This routine first extracts the Item Format Code, step 140, from the second element in the message. If the Item Format Code is a List Code (0), step 142, the routine error exits, step 144. The ASCII representation of the value is extracted, step 146. This is the ASCII version of the Collection Event ID (CEID). A search is made for the Collection Event ID, step 148, in the list of Collection Events (CE) in the Configuration File 44. If a corresponding Collection Event (CE) is not found, step 150 the routine exits, step 154, indicating to the higher level routines to ignore this message. Otherwise, a line is sent to the Script 46 setting the CEID to the string corresponding to the Collection Event ID, step 156, and the routine returns normally, step 158.

Figure 7:
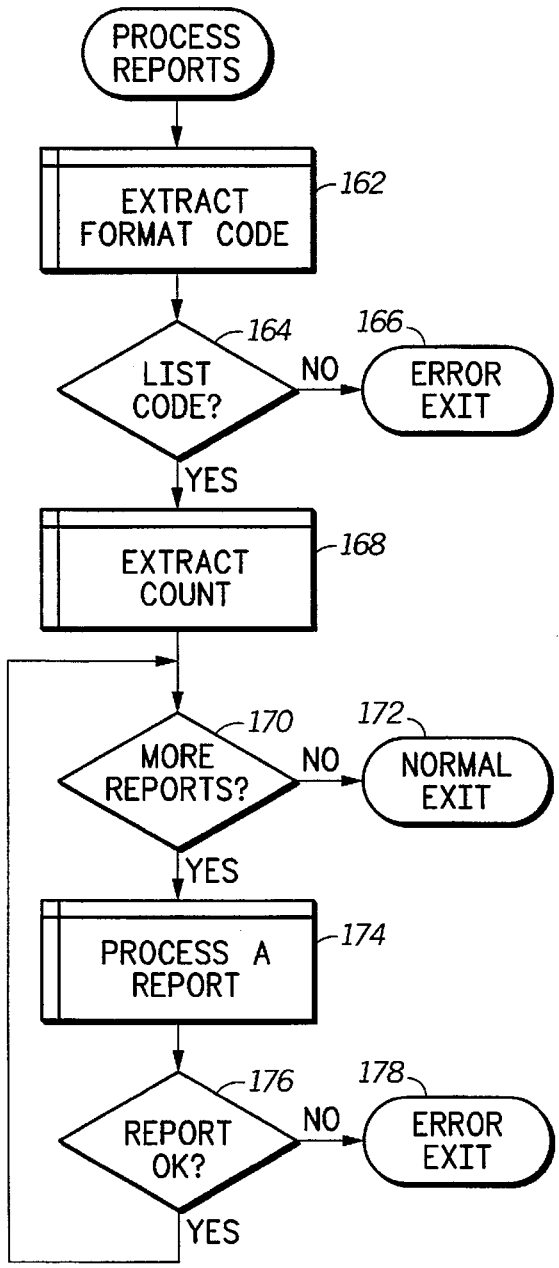

FIG. 7 is a flow chart showing the operation of the Process Reports routine, step 114 in FIG. 4. This routine first extracts the Element Format Code, step 162, from the message. If the Element Format Code is not a List type code (0), step 164, the routine error exits, step 166. Otherwise, the List count is extracted, step 168, and used to initialize a loop. Each time through the loop, a check is made whether more reports are to be processed, step 170. If no more reports remain to be processed, step 170, the routine returns normally, step 172. Otherwise, a report is processed, step, 174. If the report was not processed successfully, step 176, the routine error returns, step 178. Otherwise, the routine iterates, checking for more reports, step 170.

Figure 8:
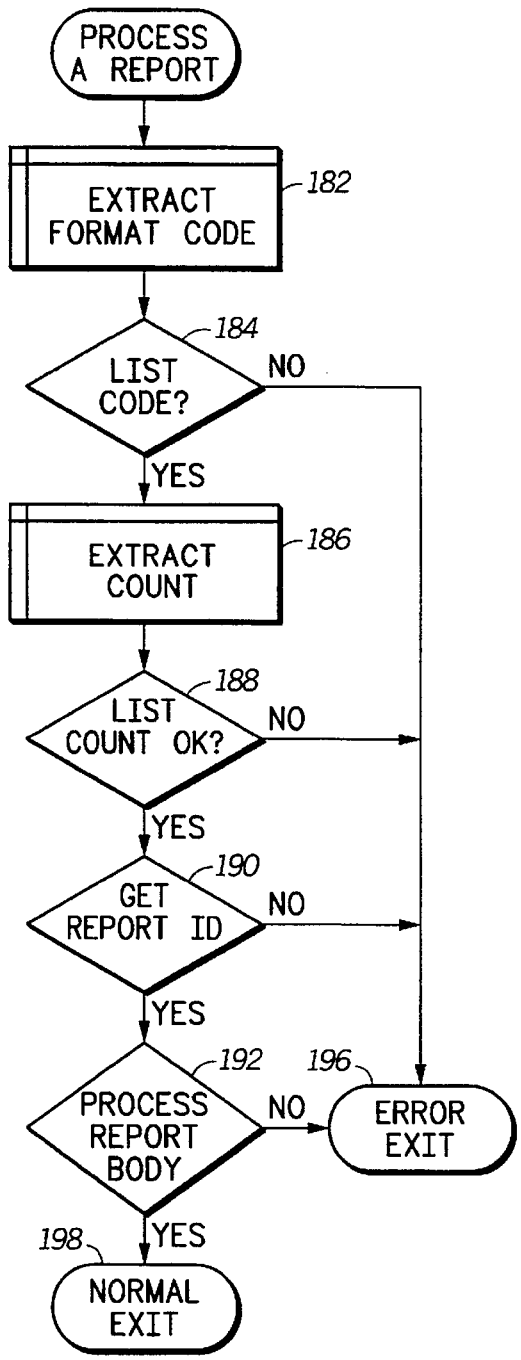

FIG. 8 is a flow chart showing the operation of the Process a Report routine, step 174 in FIG. 7. This routine first extracts the Element Format Code, step 182, from the message. If the Element Format Code is not a List type code (0), step 184, the routine error exits, step 196. Otherwise, the List count is extracted, step 186. The List count is checked, step 188, and the Report ID is extracted and checked, step 190. If either test fails, the routine error exits, step 196. Otherwise, the Report Body is Processed, step 192. If the Report Body was not successfully processed, step 192, the program error exits, step 196. Otherwise, the routine returns normally, step 198.

Figure 9:
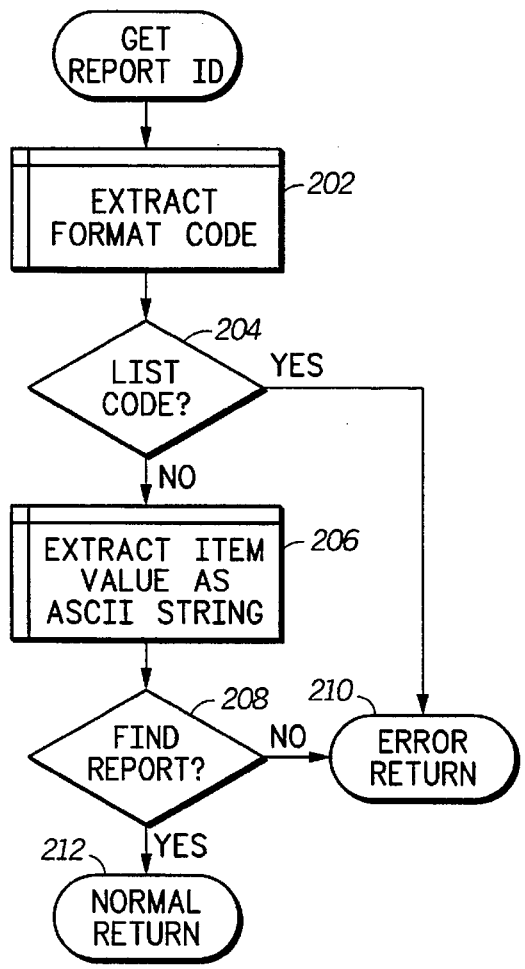

FIG. 9 is a flow chart showing the operation of the get Report ID routine, step 190 in FIG. 8. This routine first extracts the Item Format Code, step 202, from the message. If the Item Format Code is a List code (0), step 204, the routine error exits, step 210. Otherwise, the ASCII representation of the value is extracted, step 206. A list of active reports is searched for the Report ID, step 208. It is important to find a definition of the active report since it contains the number and structure of the items contains in the report. If the Report ID is not found in the list, step 208, the routine error exits, step 210. Otherwise, the routine returns normally, step 212.

Figure 10:
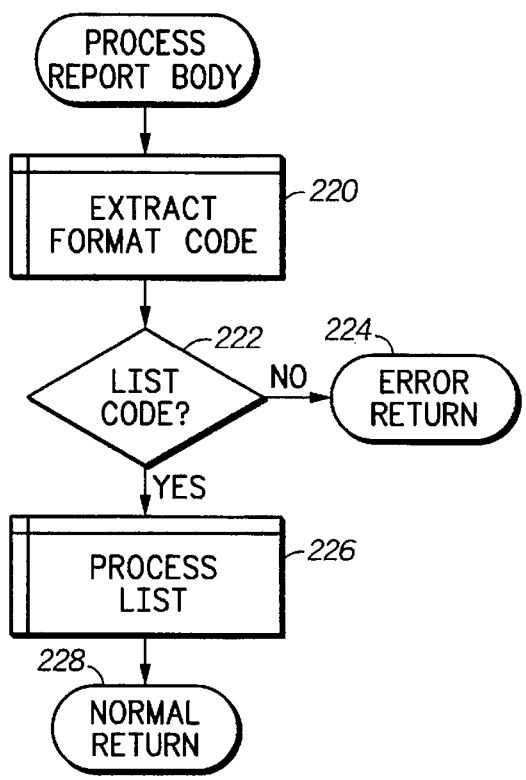

FIG. 10 is a flow chart showing the operation of the Process Report Body routine, step 192 in FIG. 8. This routine first extracts the Element Format Code, step 220, from the message. If the Element Format Code is not a List type code (0), step 222, the routine error exits, step 224. Otherwise, the List is Processed, step 226, and the routine returns normally, step 228.

Figure 11:
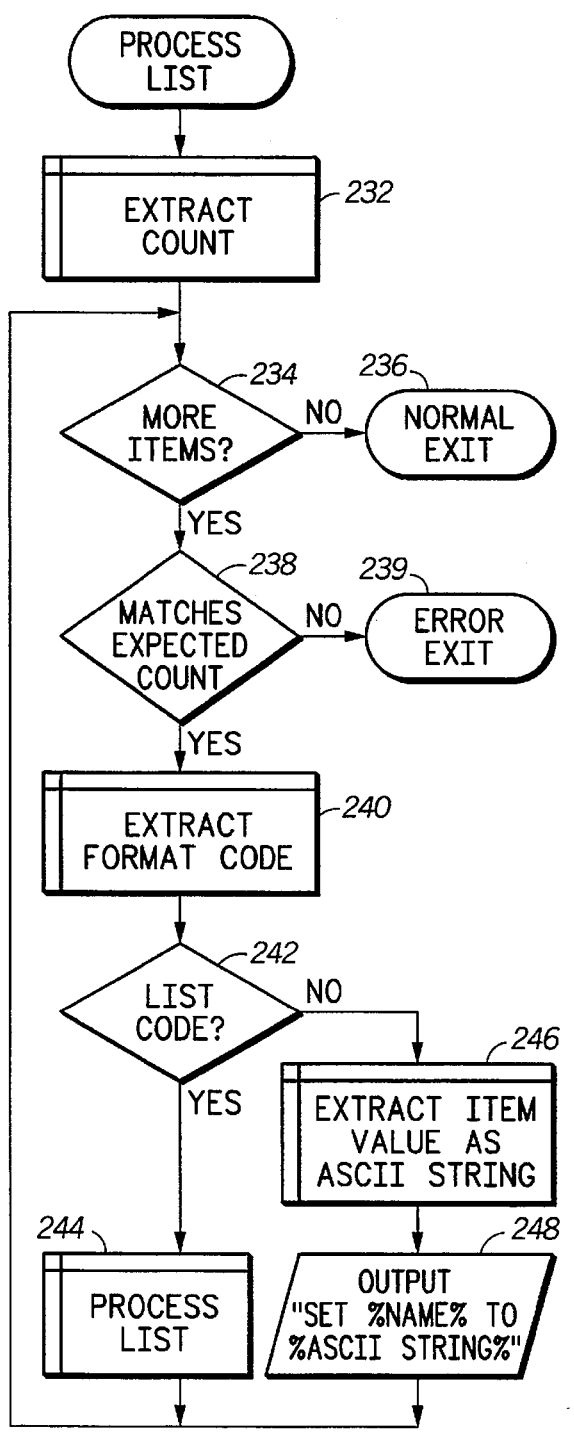

FIG. 11 is a flow chart showing the operation of the Process List routine, step 226 in FIG. 10. This routine first extracts the List Count, step 232, to initialize a loop counter. The loop is entered, and a check is made for more List elements, step 234. If there are no more List elements to process, step 234, the routine exits normally, step 236 Otherwise, a check, step 238, is made against the number of expected items left to be processed for this List as defined by the Configuration File, 44. If the counts match then the next Format Code is extracted, step 240 else an Error Exit 239 occurs The remainder of the routine is best implemented as a case statement branching on element Format Code. If the Format Code indicates a List, step 242, the Process List routine is recursively entered, step 244. If the Format Code is not a List (0) then the ASCII representation of the value is extracted, step 246, and one line is then sent to the Script 46 for each value extracted setting the specified variable to the extracted value, step 248. The routine iterates, again checking for more List items, step 234.

Figure 12:
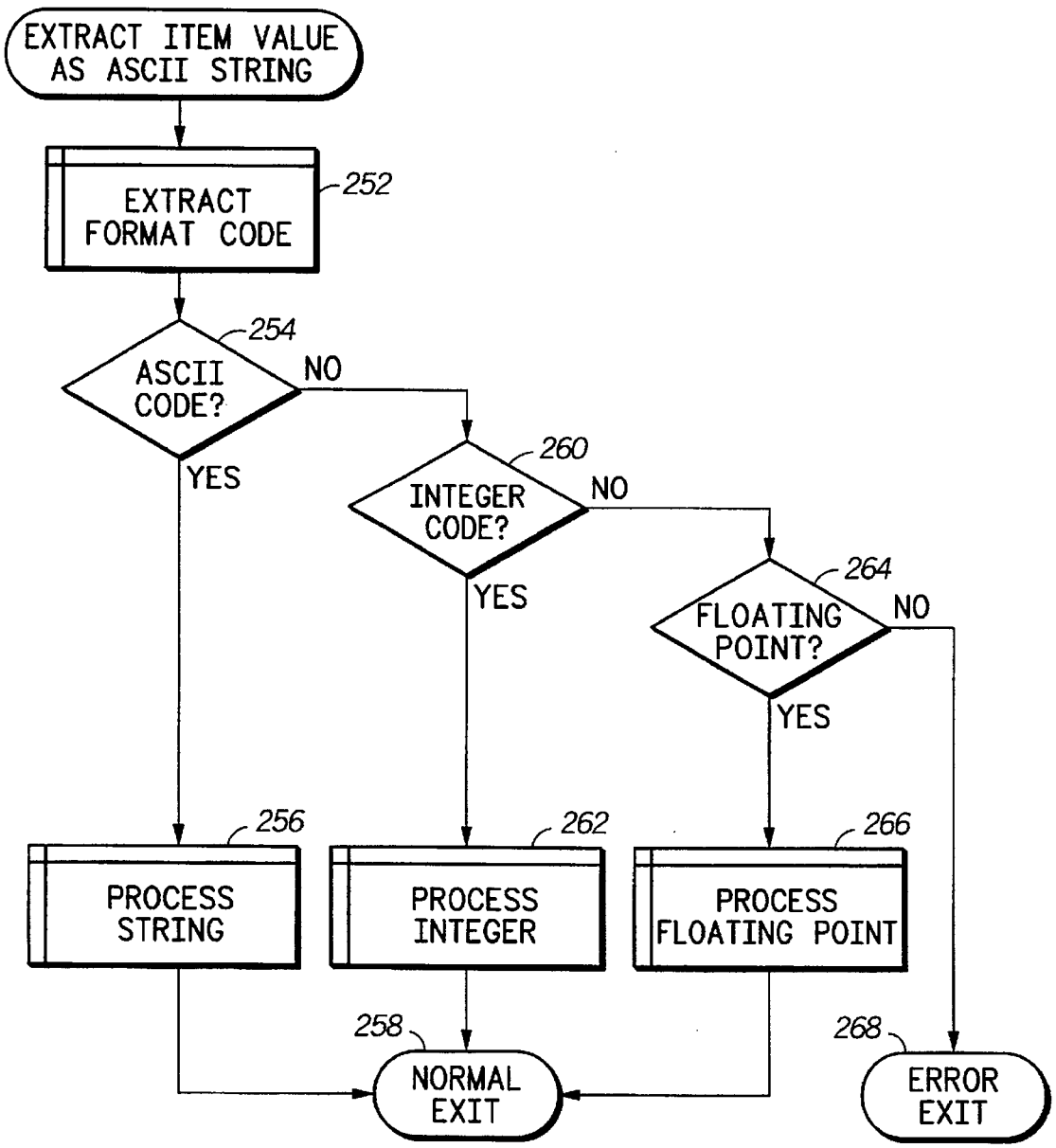

FIG. 12 is a flow chart showing the Extract Item Value as ASCII String utility operation used in steps 126 in FIG. 5; step 146 in FIG. 6; step 206 in FIG. 9; and step 246 in FIG. 11. This routine first extracts the Format Code, step 252. If the Format code indicates an integer, step 260, the Process Integer routine is entered, step 262. If the Format Code indicates an ASCII string (20), step 254, the Process ASCII routine is entered, step 256. If the Format Code indicates a floating point number, step 264, the Floating Point routine is entered, step 266. This can be done is a like manner for Binary (10), Boolean (11), and JIS-8 (21) format codes. If the format code is recognized and successfully converted, the routine returns normally, step 258. Otherwise, if the format code is unrecognized, the routine error returns, step 268.

Figure 14:
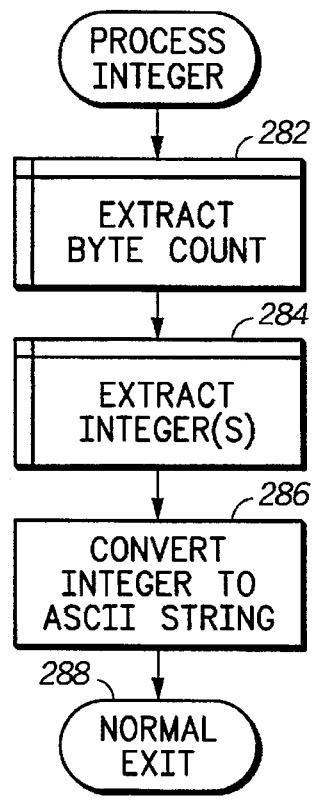

FIG. 14 is a flow chart showing the operation of the Process Integer routine, step 262 in FIG. 12. This routine first extracts the byte count, step 282. Next, the specified number of integers are extracted, step 284. The number of integers extracted is determined by dividing the element length in the previously extracted Item Format Code into the byte count extracted in step 282. Each integer is represented as a ASCII string and the strings are returned, step 286, and the routine returns normally, step 288. Note that the same routine is shown processing both signed and unsigned integers. It may prove expedient to separate the signed and unsigned integers into separate routines.

Figure 13:
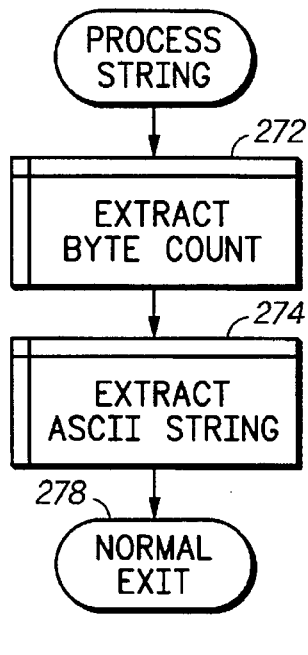

FIG. 13 is a flow chart showing the operation of the Process ASCII String routine, step 256 in FIG. 12. This routine first extracts the byte count, step 272. Next, the specified number of bytes are extracted as the ASCII string, step 274. The single ASCII string is returned when the routine returns normally, step 278.

Figure 15:
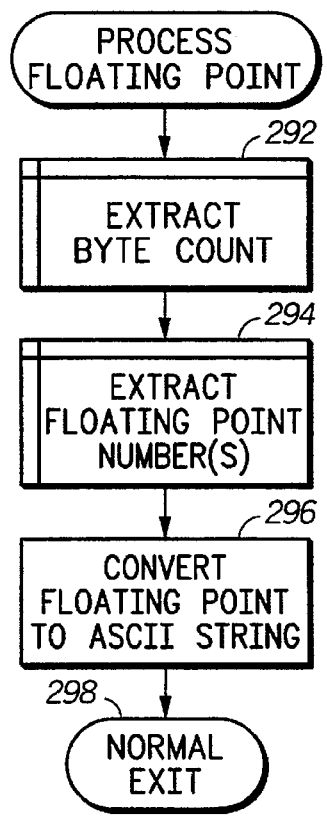

FIG. 15 is a flow chart showing the operation of the Process Floating Point routine, step 266 in FIG. 12. This routine first extracts the byte count, step 292. Next, the specified number of floating point numbers are extracted, step 294. The number of numbers extracted is determined by dividing the element length in the previously extracted Item Format Code into the byte count extracted in step 292. Each floating point number is represented as an ASCII string and the strings are returned, step 296, and the routine returns normally, step 298.

Those skilled in the art will recognize that modifications and variations can be made without departing from the spirit of the invention. Therefore, it is intended that this invention encompass all such variations and modifications as fall within the scope of the appended claims.

Attachment
- 1 -

CONFIGURATION FILE

```

#  Data Item table for Rudolph FEiv version 4.76

#  $Header: fe4.cfg,v 1.2 95/04/27 14:00:16 eimgr Exp $

#  no Stream 4, 8, 12, 13 DataItems defined

#  SECS II Data Items

DI          ABS             10
DI          ACDS            52
DI          ACKC3           10
DI          ACKC5           10
DI          ACKC6           10
DI          ACKC7           10
DI          ACKC7A          51
DI          ACKC10          10
DI          ACKC13          10
DI          ALCD            10
DI          ALED            10
DI          ALID            52
DI          ALTX            20
DI          BCDS            52
DI          BLKDEF          51
DI          BYTMAX          52
DI          CCODE           52
DI          CEED            11
DI          CEID            52
DI          CMDA            51
DI          CMDMAX          52
DI          CNAME           20
DI          COMMACK         10
DI          CPACK           10
DI          CPNAME          52
DI          DATAID          20
DI          DATALENGTH      52
DI          DRACK           10
DI          DSID            52
DI          DSNAME          20
DI          DSPER           20
DI          DVNAME          20
DI          EAC             10
DI          ECID            52
DI          ECNAME          20
DI          EDID            20
DI          ERACK           10
DI          ERRW7           20
DI          FCNID           51
DI          GRANT           10
DI          GRANT6          10
DI          HCACK           10
DI          LENGTH          54
DI          LIMITACK        10
DI          LIMITID         10
DI          LRACK           10
```

Attachment
- 2 -

```
DI      LVACK       10
DI      MEXP        20
DI      MHEAD       10
DI      OFLACK      10
DI      ONLACK      10
DI      PPBODY      10
DI      PPGNT       10
DI      PPID        20
DI      RCMD        20
DI      REPGSZ      52
DI      RIC         51
DI      RPTID       52
DI      RSDA        10
DI      RSDC        51
DI      RSPACK      10
DI      SHEAD       10
DI      SMPLN       54
DI      STRACK      10
DI      STRID       51
DI      STIME       20
DI      SVID        52
DI      SVNAME      20
DI      TEXT        20
DI      TIAACK      10
DI      TIACK       10
DI      TID         10
DI      TIME        20
DI      TOTSMP      52
DI      TRID        52
DI      TSIP        10
DI      TSOP        10
DI      UNITS       20
DI      VID         52
DI      VLAACK      10

#   Equipment Specific Data Items

DI      CASSETTE         31
DI      CASSETTE_SIZE    51
DI      CASSETTEID_HOST  20
DI      DISPLAY_WAFERS   10
DI      EQUIP1_HOST      20
DI      EQUIP2_HOST      20
DI      FILM_PARAMETERS  0    FP_L
DI      FP_L             0    FP_LAYER FPID
DI      FIT_ERROR        44
DI      FPAVG            44
DI      FP_FORMAT        10
DI      FPCOUNT          52
DI      FPDATA           44
DI      FP_VALUES        40
DI      FPID             20
DI      FP_LAYER         52
DI      FPMIN            44
DI      FPMAX            44
DI      FPRANGE          44
DI      FPSTATS          0    FPS_L
DI      FPS_L            0    FPMIN FPMAX FPAVG FPRANGE FPSTDDEV
```

Attachment
- 3 -

```
DI      FPSTDDEV        44
DI      FSINDEX         52
DI      FSNAME          20
DI      LOTID_HOST      20
DI      MEAS_CODE       52
DI      MEAS_SITES      0       MS_L
DI      MS_L            0       POINT_COORD
DI      POINT_COORD     44
DI      POINT_NUM       52
DI      WAFERID_HOST    20
DI      WAFER_SLOTS     31
DI      XFER_STYLE      31
DI      FS_L            0       FSINDEX FSNAME FPCOUNT FILM_PARAMETERS
DI      FSS_L           0       FSINDEX FPSTATS
DI      MD_L            0       POINT_NUM POINT_COORD MEAS_CODE FSINDEX FIT_ERROR FPDATA

#       Status Variables

SV      101             PREV_PROC_STATE         51
SV      102             PROCESS_STATE           51
SV      103             MDLN                    20
SV      104             SERIAL_NUMBER           20
SV      105             SOFTREV                 20
SV      106             CONTROL_STATE           51
SV      107             CE_TIMESTAMP            20
SV      108             LAST_RCMD               20
SV      109             RECIPE_NAME             20
SV      110             RECIPE_STEP             20
SV      111             LAST_EVENT              52
SV      112             CASSETTE1_STATUS        51
SV      113             CASSETTE2_STATUS        51
SV      114             CASSETTE3_STATUS        51
SV      115             OPNAME                  20
SV      116             ALARMS_ENABLED          0       ALID
SV      117             ALARMS_SET              0       ALID
SV      118             CLOCK                   20
SV      119             EVENTS_ENABLED          0       CEID
SV      120             LAST_CAS_STATUS_CHANGE  0       CASSETTE CASSETTE_SIZE
SV      121             PROCESS_PROGRAM_NAME    20
SV      122             SPOOL_FULL_TIME         20
SV      123             SPOOL_START_TIME        20
SV      124             SPOOL_COUNT_ACTUAL      52
SV      125             SPOOL_COUNT_TOTAL       52
SV      126             PROCESS_START_TIME      20

#       Equipment Specific Data Variables

DV      202             CASSETTE_SLOT           52
DV      203             WAFERID                 20
DV      204             LOTID                   20
DV      205             POINT_COUNT             52
DV      206             FILMSTACK_COUNT         52
DV      207             CASSETTEID              20
DV      208             ALARMID                 52
DV      209             OPERATOR_COMMAND        52
DV      210             ECID_CHANGE             52
DV      211             EQUIP1                  20
DV      212             EQUIP2                  20
```

Attachment
- 4 -

```
DV      213             CASSETTE_NUM_WC         52
DV      214             CASSETTE_NUM_MR         52
DV      1201            FILMSTACKS              0       FS_L
DV      1202            FS_STATISTICS           0       FSS_L
DV      1203            MEAS_DATA               0       MD_L

#   Equipment Defined ReportID

RP      1               OPNAME RECIPE_NAME RECIPE_STEP CASSETTE_SLOT CE_TIMESTAMP \n
                        WAFERID LOTID POINT_COUNT FILMSTACK_COUNT FILMSTACKS
RP      2               MEAS_DATA
RP      3               FS_STATISTICS
RP      4               CE_TIMESTAMP
RP      5               CE_TIMESTAMP LAST_CAS_STATUS_CHANGE
RP      6               ALARMID
RP      7               SPOOL_START_TIME
RP      8               SPOOL_COUNT_TOTAL
RP      9               SPOOL_COUNT_ACTUAL SPOOL_COUNT_TOTAL
RP      10              ECID_CHANGE
RP      11              PREV_PROC_STATE PROCESS_STATE
RP      12              OPERATOR_COMMAND
RP      13              PROCESS_START_TIME
RP      14              CASSETTE_NUM_WC
RP      15              CASSETTE_NUM_MR

#   Collection Events

CE      301             EXIT
CE      302             INIT_STARTED
CE      303             INIT_COMPLETE
CE      304             ABORT_STARTED
CE      305             ABORT_COMPLETE
CE      306             LOGIN_STARTED
CE      307             LOGIN_COMPLETE
CE      308             LOGIN_ABORTED
CE      309             SETUP_STARTED
CE      310             SETUP_COMPLETE
CE      311             SETUP_ABORTED
CE      312             WAFER_COMPLETE
CE      313             CASSETTE_COMPLETE
CE      314             EXE_STARTED
CE      315             PAUSE
CE      316             RESUME
CE      317             OPERATOR_ACK
CE      318             LOCAL_CONTROL
CE      319             REMOTE_CONTROL
CE      320             WAFER_SKIP
CE      321             EQUIPMENT_OFF_LINE
CE      322             MATERIAL_RECEIVED
CE      323             MATERIAL_REMOVED
CE      324             ALARM_DETECTED
CE      325             ALARM_CLEARED
CE      326             SPOOLING_ACTIVATED
CE      327             SPOOLING_DEACTIVATED
CE      328             SPOOL_TRANSMIT_FAILURE
CE      329             OPERATOR_EC_CHANGE
CE      330             PROCESSING_STATE_CHANGE
CE      331             OPERATOR_COMMAND_ISSUED
```

```
                        Attachment
                          - 5 -

CE      332             WAFER_COMPLETE_ON
CE      333             WAFER_COMPLETE_OFF
CE      334             MOVE_IN_REQUEST
CE      335             MOVE_OUT_REQUEST

```

DATA COLLECTION SAMPLE PLAN FILE

```

# data collection sampling plan for Rudolph FE4

# $Header: fe4.dcsp,v 1.5 95/05/17 15:31:23 eimgr Exp $

proc COMMUNICATION_ESTABLISHED {} {
    exec ./establish_comm
} proc DCSP_INIT {} { edevent disable WAFER_COMPLETE
    lnkreport " " WAFER_COMPLETE
    defreport " " 101
    defreport " " 101 OPNAME WAFERID LOTID EQUIP1 EQUIP2 POINT_COUNT MEAS_DATA
    lnkreport " " WAFER_COMPLETE 4 101
    edevent enable WAFER_COMPLETE
    return OK

} proc EVENT {} {
    global CEID
    global CE_TIMESTAMP set fn [ open event.log a ]
    puts $fn "Event at $CE_TIMESTAMP(1): $CEID(1)"
    close $fn
} proc WAFER_COMPLETE {} {
    eval global [ info globals * ]
    set filename [ buildValidName $LOTID(1) $WAFERID(1) $CE_TIMESTAMP(1) ]
    set fn [ open $filename w ]
    puts $fn "EQUIPID/A=\"$EQUIP_ID(1)\""
    puts $fn "LOTID/A=\"$LOTID(1)\""
    puts $fn "WAFERID/A=\"$WAFERID(1)\""
    for {set i 1} { $i <= $POINT_COUNT(1) } { incr i 1} {
        eval puts $fn "THICK_$i/F4=\$MEAS_DATA_${i}_MD_L_FPDATA(1)"
    }
    close $fn
    exec ./publish $filename
}
```

Attachment
- 6 -

EVENT REPORT SECS MESSAGE

```
S6F11 W
  < L [3]
    < A [16] "                ">
    < U2 [1] 312>
    < L [2]
      < L [2]
        < U2 [1] 4>
        < L [1]
          < A [12] "950717150511">
        >
      >
      < L [2]
        < U2 [1] 101>
        < L [7]
          < A [32] "DEFAULT                         ">
          < A [16] "                ">
          < A [16] "                ">
          < A [32] "                                ">
          < A [32] "                                ">
          < U2 [1] 9>
          < L [9]
            < L [6]
              < U2 [1] 1>
              < F4 [2] 0 0 >
              < U2 [1] 0>
              < U2 [1] 1>
              < F4 [1] 0.031967>
              < F4 [1] 2946.52>
            >
            < L [6]
              < U2 [1] 2>
              < F4 [2] 0 94 >
              < U2 [1] 0>
              < U2 [1] 1>
              < F4 [1] 0.044838>
              < F4 [1] 2938.65>
            >
            < L [6]
              < U2 [1] 3>
              < F4 [2] 94 0 >
              < U2 [1] 0>
              < U2 [1] 1>
              < F4 [1] 0.027193>
              < F4 [1] 2981.04>
            >
            < L [6]
              < U2 [1] 4>
              < F4 [2] 0 -92 >
              < U2 [1] 0>
              < U2 [1] 1>
              < F4 [1] 0.031375>
```

Attachment
- 7 -

```
    < F4 [1] 2988.1>
>
< L [6]
    < U2 [1] 5>
    < F4 [2] -94 0 >
    < U2 [1] 0>
    < U2 [1] 1>
    < F4 [1] 0.035842>
    < F4 [1] 2933.7>
>
< L [6]
    < U2 [1] 6>
    < F4 [2] 40 40 >
    < U2 [1] 0>
    < U2 [1] 1>
    < F4 [1] 0.042626>
    < F4 [1] 2952.86>
>
< L [6]
    < U2 [1] 7>
    < F4 [2] 40 -40 >
    < U2 [1] 0>
    < U2 [1] 1>
    < F4 [1] 0.025687>
    < F4 [1] 2970.98>
>
< L [6]
    < U2 [1] 8>
    < F4 [2] -40 -40 >
    < U2 [1] 0>
    < U2 [1] 1>
    < F4 [1] 0.026787>
    < F4 [1] 2959.27>
>
< L [6]
    < U2 [1] 9>
    < F4 [2] -40 40 >
    < U2 [1] 0>
    < U2 [1] 1>
    < F4 [1] 0.041641>
    < F4 [1] 2922.91>
>
            >
        >
      >
     >
    >
   >
```

Attachment
- 8 -

SERVER GENERATED SCRIPT

```
set EQUIP_ID(1) {UDFM03}
set DATAID(1) {}
set CEID(1) WAFER_COMPLETE
set REPORTID(1) {4}
set CE_TIMESTAMP(1) {950717150511}
set REPORTID(2) {101}
set OPNAME(1) {DEFAULT}
set WAFERID(1) {}
set LOTID(1) {}
set EQUIP1(1) {}
set EQUIP2(1) {}
set POINT_COUNT(1) {9}
set MEAS_DATA_1_MD_L_POINT_NUM(1) {1}
set MEAS_DATA_1_MD_L_POINT_COORD(1) {0}
set MEAS_DATA_1_MD_L_POINT_COORD(2) {0}
set MEAS_DATA_1_MD_L_MEAS_CODE(1) {0}
set MEAS_DATA_1_MD_L_FSINDEX(1) {1}
set MEAS_DATA_1_MD_L_FIT_ERROR(1) {0.031967}
set MEAS_DATA_1_MD_L_FPDATA(1) {2946.52}
set MEAS_DATA_2_MD_L_POINT_NUM(1) {2}
set MEAS_DATA_2_MD_L_POINT_COORD(1) {0}
set MEAS_DATA_2_MD_L_POINT_COORD(2) {94}
set MEAS_DATA_2_MD_L_MEAS_CODE(1) {0}
set MEAS_DATA_2_MD_L_FSINDEX(1) {1}
set MEAS_DATA_2_MD_L_FIT_ERROR(1) {0.044838}
set MEAS_DATA_2_MD_L_FPDATA(1) {2938.65}
set MEAS_DATA_3_MD_L_POINT_NUM(1) {3}
set MEAS_DATA_3_MD_L_POINT_COORD(1) {94}
set MEAS_DATA_3_MD_L_POINT_COORD(2) {0}
set MEAS_DATA_3_MD_L_MEAS_CODE(1) {0}
set MEAS_DATA_3_MD_L_FSINDEX(1) {1}
set MEAS_DATA_3_MD_L_FIT_ERROR(1) {0.027193}
set MEAS_DATA_3_MD_L_FPDATA(1) {2981.04}
set MEAS_DATA_4_MD_L_POINT_NUM(1) {4}
set MEAS_DATA_4_MD_L_POINT_COORD(1) {0}
set MEAS_DATA_4_MD_L_POINT_COORD(2) {-92}
set MEAS_DATA_4_MD_L_MEAS_CODE(1) {0}
set MEAS_DATA_4_MD_L_FSINDEX(1) {1}
set MEAS_DATA_4_MD_L_FIT_ERROR(1) {0.031375}
set MEAS_DATA_4_MD_L_FPDATA(1) {2988.1}
set MEAS_DATA_5_MD_L_POINT_NUM(1) {5}
set MEAS_DATA_5_MD_L_POINT_COORD(1) {-94}
set MEAS_DATA_5_MD_L_POINT_COORD(2) {0}
set MEAS_DATA_5_MD_L_MEAS_CODE(1) {0}
set MEAS_DATA_5_MD_L_FSINDEX(1) {1}
set MEAS_DATA_5_MD_L_FIT_ERROR(1) {0.035842}
set MEAS_DATA_5_MD_L_FPDATA(1) {2933.7}
set MEAS_DATA_6_MD_L_POINT_NUM(1) {6}
set MEAS_DATA_6_MD_L_POINT_COORD(1) {40}
set MEAS_DATA_6_MD_L_POINT_COORD(2) {40}
set MEAS_DATA_6_MD_L_MEAS_CODE(1) {0}
```

Attachment
- 9 -

```
set MEAS_DATA_6_MD_L_FSINDEX(1) {1}
set MEAS_DATA_6_MD_L_FIT_ERROR(1) {0.042626}
set MEAS_DATA_6_MD_L_FPDATA(1) {2952.86}
set MEAS_DATA_7_MD_L_POINT_NUM(1) {7}
set MEAS_DATA_7_MD_L_POINT_COORD(1) {40}
set MEAS_DATA_7_MD_L_POINT_COORD(2) {-40}
set MEAS_DATA_7_MD_L_MEAS_CODE(1) {0}
set MEAS_DATA_7_MD_L_FSINDEX(1) {1}
set MEAS_DATA_7_MD_L_FIT_ERROR(1) {0.025687}
set MEAS_DATA_7_MD_L_FPDATA(1) {2970.98}
set MEAS_DATA_8_MD_L_POINT_NUM(1) {8}
set MEAS_DATA_8_MD_L_POINT_COORD(1) {-40}
set MEAS_DATA_8_MD_L_POINT_COORD(2) {-40}
set MEAS_DATA_8_MD_L_MEAS_CODE(1) {0}
set MEAS_DATA_8_MD_L_FSINDEX(1) {1}
set MEAS_DATA_8_MD_L_FIT_ERROR(1) {0.026787}
set MEAS_DATA_8_MD_L_FPDATA(1) {2959.27}
set MEAS_DATA_9_MD_L_POINT_NUM(1) {9}
set MEAS_DATA_9_MD_L_POINT_COORD(1) {-40}
set MEAS_DATA_9_MD_L_POINT_COORD(2) {40}
set MEAS_DATA_9_MD_L_MEAS_CODE(1) {0}
set MEAS_DATA_9_MD_L_FSINDEX(1) {1}
set MEAS_DATA_9_MD_L_FIT_ERROR(1) {0.041641}
set MEAS_DATA_9_MD_L_FPDATA(1) {2922.91}
if {[info command EVENT]=="EVENT"} {catch EVENT}
if {[info command WAFER_COMPLETE]=="WAFER_COMPLETE"} {catch
WAFER_COMPLETE}
unset EQUIP_ID
unset DATAID
unset CEID
unset CE_TIMESTAMP
unset OPNAME
unset WAFERID
unset LOTID
unset EQUIP1
unset EQUIP2
unset POINT_COUNT
unset MEAS_DATA_1_MD_L_POINT_NUM
unset MEAS_DATA_1_MD_L_POINT_COORD
unset MEAS_DATA_1_MD_L_MEAS_CODE
unset MEAS_DATA_1_MD_L_FSINDEX
unset MEAS_DATA_1_MD_L_FIT_ERROR
unset MEAS_DATA_1_MD_L_FPDATA
unset MEAS_DATA_2_MD_L_POINT_NUM
unset MEAS_DATA_2_MD_L_POINT_COORD
unset MEAS_DATA_2_MD_L_MEAS_CODE
unset MEAS_DATA_2_MD_L_FSINDEX
unset MEAS_DATA_2_MD_L_FIT_ERROR
unset MEAS_DATA_2_MD_L_FPDATA
unset MEAS_DATA_3_MD_L_POINT_NUM
unset MEAS_DATA_3_MD_L_POINT_COORD
unset MEAS_DATA_3_MD_L_MEAS_CODE
unset MEAS_DATA_3_MD_L_FSINDEX
```

Attachment
- 10 -

```
unset MEAS_DATA_3_MD_L_FIT_ERROR
unset MEAS_DATA_3_MD_L_FPDATA
unset MEAS_DATA_4_MD_L_POINT_NUM
unset MEAS_DATA_4_MD_L_POINT_COORD
unset MEAS_DATA_4_MD_L_MEAS_CODE
unset MEAS_DATA_4_MD_L_FSINDEX
unset MEAS_DATA_4_MD_L_FIT_ERROR
unset MEAS_DATA_4_MD_L_FPDATA
unset MEAS_DATA_5_MD_L_POINT_NUM
unset MEAS_DATA_5_MD_L_POINT_COORD
unset MEAS_DATA_5_MD_L_MEAS_CODE
unset MEAS_DATA_5_MD_L_FSINDEX
unset MEAS_DATA_5_MD_L_FIT_ERROR
unset MEAS_DATA_5_MD_L_FPDATA
unset MEAS_DATA_6_MD_L_POINT_NUM
unset MEAS_DATA_6_MD_L_POINT_COORD
unset MEAS_DATA_6_MD_L_MEAS_CODE
unset MEAS_DATA_6_MD_L_FSINDEX
unset MEAS_DATA_6_MD_L_FIT_ERROR
unset MEAS_DATA_6_MD_L_FPDATA
unset MEAS_DATA_7_MD_L_POINT_NUM
unset MEAS_DATA_7_MD_L_POINT_COORD
unset MEAS_DATA_7_MD_L_MEAS_CODE
unset MEAS_DATA_7_MD_L_FSINDEX
unset MEAS_DATA_7_MD_L_FIT_ERROR
unset MEAS_DATA_7_MD_L_FPDATA
unset MEAS_DATA_8_MD_L_POINT_NUM
unset MEAS_DATA_8_MD_L_POINT_COORD
unset MEAS_DATA_8_MD_L_MEAS_CODE
unset MEAS_DATA_8_MD_L_FSINDEX
unset MEAS_DATA_8_MD_L_FIT_ERROR
unset MEAS_DATA_8_MD_L_FPDATA
unset MEAS_DATA_9_MD_L_POINT_NUM
unset MEAS_DATA_9_MD_L_POINT_COORD
unset MEAS_DATA_9_MD_L_MEAS_CODE
unset MEAS_DATA_9_MD_L_FSINDEX
unset MEAS_DATA_9_MD_L_FIT_ERROR
unset MEAS_DATA_9_MD_L_FPDATA
unset REPORTID
```

Attachment
- 11 -

RESULTING OUTPUT in file named "__950717150511"

```
EQUIPID/A="UDFM03"
LOTID/A=""
WAFERID/A=""
THICK_1/F4=2946.52
THICK_2/F4=2938.65
THICK_3/F4=2981.04
THICK_4/F4=2988.1
THICK_5/F4=2933.7
THICK_6/F4=2952.86
THICK_7/F4=2970.98
THICK_8/F4=2959.27
THICK_9/F4=2922.91
```

I claim:

1. A method of automatically recording on a Host Computer information from operation of Factory Equipment received from an Interface Server connected to the Factory Equipment, said method comprising the steps of:
   a) describing a message format in a Configuration;
   b) enabling one or more reports by executing a Sampling Plan;
   c) receiving a message containing a report from the Interface Server over a communications line;
   d) translating the message into a Script utilizing the Configuration; and
   e) interpreting the Script causing information contained in the report to be written to an Output File stored on Secondary Storage.

2. The method in claim 1 wherein the information recorded comprise statistics from operation of the Factory Equipment.

3. The method in claim 1 wherein the Configuration is stored in a Configuration File stored on Secondary Storage.

4. The method in claim 1 wherein the Sampling Plan is stored in a Sampling Plan File stored on Secondary Storage.

5. The method in claim 1 wherein the Script is stored as a file on Secondary Storage.

6. The method in claim 1 wherein the message received in step (c) is encoded in a SECS-II format.

7. The method in claim 1 wherein the message received in step (c) was transmitted over the communications line using a SECS-I protocol.

8. The method in claim 1 wherein the Interface Server generally conforms to a SEMI GEM standard.

9. The method in claim 1 wherein within step (e): the Script is interpreted by a Tcl/Tk interpreter.

10. A method of automatically recording on a Host Computer statistics from operation of Factory Equipment received from a GEM compliant Interface Server connected to the Factory Equipment, said method comprising the steps of:
    a) describing a message format in a Configuration contained in a Configuration File stored on Secondary Storage;
    b) enabling one or more reports by executing a Sampling Plan contained in a Sampling Plan File stored on Secondary Storage;
    c) receiving a message containing a report encoded in SECS-II format from the GEM compliant Interface Server over a communications line;
    d) translating the message into a Script utilizing the Configuration; and
    e) interpreting the Script causing statistics contained in the report to be written to an Output File stored on Secondary Storage.

11. An apparatus for recording information from operation of Factory Equipment received by a Host Computer from an Interface Server connected to the Factory Equipment, said apparatus comprising:
    a) means for describing a message format in a Configuration;
    b) means for enabling one or more reports by executing a Sampling Plan;
    c) means for receiving a message containing a report from the Interface Server over a communications line;
    d) means for translating the message into a Script utilizing the Configuration; and
    e) means for interpreting the Script causing information contained in the report to be written to an Output File stored on Secondary Storage.

12. The apparatus in claim 11 wherein the information recorded comprise statistics from operation of the Factory Equipment.

13. The apparatus in claim 11 wherein the Configuration is stored in a Configuration File stored on Secondary Storage.

14. The apparatus in claim 11 wherein the Sampling Plan is stored in a Sampling Plan File stored on Secondary Storage.

15. The apparatus in claim 11 wherein the Script is stored as a file on Secondary Storage.

16. The apparatus in claim 11 wherein the message received in element (c) is encoded in a SECS-II format.

17. The apparatus in claim 11 wherein the message received in element (c) was transmitted over the communications line using a SECS-II protocol.

18. The apparatus in claim 11 wherein the Interface Server generally conforms to a SEMI GEM standard.

19. The apparatus in claim 11 wherein within step (e): the Script is interpreted by a Tcl/Tk interpreter.

20. An apparatus of automatically recording from operation of Factory Equipment received by a Host Computer from a GEM compliant Interface Server connected to the Factory Equipment, said apparatus comprising:
    a) means for describing a message format in a Configuration contained in a Configuration File stored on Secondary Storage;
    b) means for enabling one or more reports by executing a Sampling Plan contained in a Sampling Plan File stored on Secondary Storage;
    c) means for receiving a message containing a report encoded in SECS-II format from the GEM compliant Interface Server over a communications line;
    d) means for translating the message into a Script utilizing the Configuration; and
    e) means for interpreting the Script causing statistics contained in the report to be written to an Output File stored on Secondary Storage.

21. A data processing system for automatically recording on a Host Computer information from operation of Factory Equipment received from an Interface Server connected to the Factory Equipment, said data processing system comprising:
    a) a Configuration file containing a Configuration stored on Secondary Storage containing a description of a message format;
    b) a Sampling Plan file containing a Sampling Plan stored on Secondary Storage, wherein:
       the Sampling Plan identifies one or more reports to be enabled;
    c) a communications interface to a communications line for receiving a message containing a report from the Interface Server over the communications line;
    d) a translation program for translating the message into a Script utilizing the Configuration; and
    e) an interpreter wherein:
       interpreting the Script causes information contained in the report to be written to an Output File stored on Secondary Storage.

* * * * *